US012769600B2

(12) United States Patent
Chandrasekharan et al.

(10) Patent No.: US 12,769,600 B2
(45) Date of Patent: Oct. 20, 2026

(54) TECHNIQUES FOR METRIC AND LOGS VISUALIZATION

(71) Applicant: Cisco Technology, Inc., San Jose, CA (US)

(72) Inventors: Ramkumar Chandrasekharan, Saratoga, CA (US); Daniel Kent Ferguson, Broomfield, CO (US); Yogesh Jadhav, Dublin, CA (US); Rehan Salman Mulla, Fremont, CA (US); John Bennett Wundes, Santa Rosa, CA (US); Wen Yin, Richmond (CA); Ankit Chetan Bhagat, San Jose, CA (US); Kartavya Soni, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 18/941,797

(22) Filed: Nov. 8, 2024

(65) Prior Publication Data

US 2026/0133863 A1 May 14, 2026

(51) Int. Cl.
*G06F 11/07* (2006.01)

(52) U.S. Cl.
CPC ................................ *G06F 11/0751* (2013.01)

(58) Field of Classification Search
CPC ............................ G06F 11/07; G06F 11/0751
See application file for complete search history.

(56) References Cited

U.S. PATENT DOCUMENTS

| | | | | |
|---|---|---|---|---|
| 10,972,334 B2 * | 4/2021 | Delinocci | ........... | H04L 41/0654 |
| 11,449,409 B2 * | 9/2022 | Singh | ...................... | G06F 17/40 |
| 11,704,285 B1 * | 7/2023 | Lamar | .................. | G06F 11/324 707/609 |
| 12,095,797 B1 * | 9/2024 | Behl | ...................... | H04L 41/16 |
| 2017/0123956 A1 * | 5/2017 | Lindo | .................. | G06F 11/323 |
| 2019/0068627 A1 | 2/2019 | Thampy | | |
| 2020/0092180 A1 * | 3/2020 | Bajaj | .................... | H04L 67/535 |
| 2020/0153678 A1 * | 5/2020 | Delinocci | ............. | H04L 41/065 |
| 2022/0156249 A1 * | 5/2022 | Luedtke | .............. | G06F 16/2379 |
| 2022/0247695 A1 | 8/2022 | Kulkarni et al. | | |
| 2023/0139224 A1 * | 5/2023 | Bangera | .............. | G06F 16/2379 707/615 |
| 2023/0385288 A1 | 11/2023 | Kulkarni et al. | | |
| 2024/0129285 A1 | 4/2024 | Ead et al. | | |

(Continued)

*Primary Examiner* — Kamini B Patel

(74) *Attorney, Agent, or Firm* — Kilpatrick Townsend & Stockton LLP

(57) ABSTRACT

In some implementations, techniques may include receiving, by a first system, a plurality of logs having events data for a set of events that have occurred at a monitored system. In addition, the techniques may include receiving a first metric and associated data from a second system. The first metric can be computed by the second system based upon observability data. The techniques may include identifying a first portion of the events data that corresponds to the first metric and the associated data. Moreover, the techniques may include generating a dashboard. The first metric and the associated data can be displayed in the dashboard's first section and the first portion of the events data can be displayed in the dashboard's second section. The first section and the second section can be displayed concurrently on the dashboard. The techniques may include causing the dashboard to be displayed on a display device.

20 Claims, 9 Drawing Sheets

(56) References Cited

U.S. PATENT DOCUMENTS

| | | | | |
|---|---|---|---|---|
| 2024/0154968 | A1 | 5/2024 | Kwon et al. | |
| 2024/0256518 | A1 | 8/2024 | Zhang et al. | |
| 2024/0256575 | A1 | 8/2024 | Zhang et al. | |
| 2024/0289347 | A1* | 8/2024 | Panwar | G06F 16/24568 |
| 2025/0165376 | A1* | 5/2025 | Karis | G06F 9/547 |

* cited by examiner

TECHNIQUES FOR METRIC AND LOGS VISUALIZATION

BACKGROUND

Cloud-based computer systems can be complicated with software executing on diverse computing devices that are distributed globally. The complexity of these systems can mean that the analysis to identify the source of errors within these systems, and to identify the solutions to correct these errors, can be difficult. In addition, many of the services provided through these cloud-based computer systems are time sensitive, and the system's users may not tolerate lengthy delays that are caused by troubleshooting the system. An integrated system that can allow access both observability metrics data and logs data can reduce the time to diagnose and correct errors within services executing on cloud-based computer systems.

BRIEF DESCRIPTION OF THE DRAWINGS

Illustrative examples are described in detail below with reference to the following figures.

DETAILED DESCRIPTION OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Techniques, which may be embodied herein as systems, computing devices, methods, algorithms, software, code, computer readable media, or the like, are described herein for presenting observability metrics and logs data.

Logs data and observability metrics data can be used to monitor the health and performance of a computer system. Logs data can include text-based descriptions of events that are associated with software or hardware in the computer system, and observability metrics data (e.g., metrics) can include numeric values that describe a parameter of an observed system. For example, a metric can include a packet loss rate.

Logs data and observability metrics data can provide different insights into the operations of a monitored system. Observability metrics data can provide an insight into the regular operation of the system, while logs data can provide information about unusual states for the system. In an abstract example, the observed system can be thought of as a car, the metrics data can be the car's speed, and the logs data can be a flat tire light. A driver uses the speed as feedback during a drive, and the driver adjusts his behavior so that the car stays within the speed limit. Eventually, the driver notices that his speed begins to drop, but the speedometer does not provide any insight into what the caused the drop. Instead of using the speedometer to diagnose the issue, the driver checks the car's low tire pressure indicator to discover that he has a flat tire.

Similarly, the metrics data can be used to adjust a monitored system during predictable states of the system's operation, and logs data can be used to determine unpredictable states of the system. For example, metrics about a server's CPU utilization percentage may help an engineer to understand that a website hosted by the server is not performing as expected because the server does not have sufficient available computing resources to handle the current workload. Logs data can be used for unpredictable use cases such as a detected security vulnerability on a server.

Figure 1:
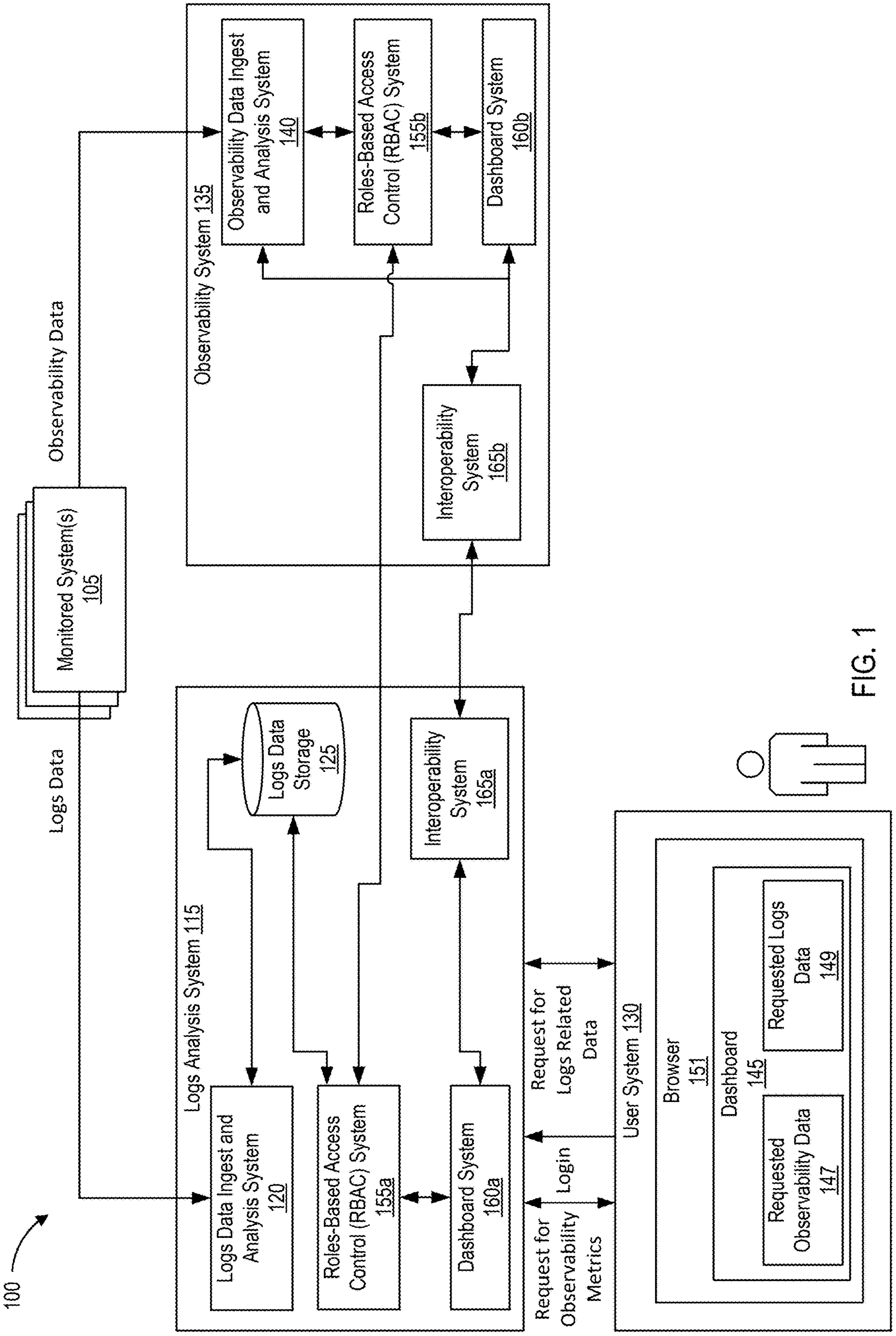
FIG. 1 shows an overview of an example architecture for presenting observability metrics and logs data according to at least one embodiment.

Turning now to FIG. 1, FIG. 1 shows an overview of an example architecture 100 for presenting observability metrics and logs data according to at least one embodiment. Each system in architecture 100 can be implemented in software, in hardware, or in a combination of software and hardware. Any combination of any number of the systems can offer a service that can be subscribed to by a user. In certain embodiments, these services can be provided by a cloud service provider and the customers of the cloud service provider can subscribe to the service.

Architecture 100 can be used to record, process, and present data from monitored system(s) 105. This data can include both logs data and metrics data that is associated with the monitored systems(s) 105. The monitored system(s) 105 can include application programming interfaces, web services, application user interfaces, browser interfaces, mobile user interfaces, distributed applications, monolithic applications, network interface cards, virtual machines, and bare machines. Any combination of the systems disclosed in architecture 100 can be used to perform any of the techniques or methods described in this disclosure.

Logs data produced by these monitored system(s) 105 can include information about events that occur with these systems. Logs data can include events data for a set of events that have occurred at a monitored system 105. The events data can include Event text, event source, event source type, and an event host, and a destination index for the log event. Logs data can be used to track user activities, identify errors, and monitor the application's performance. Logs data can include application logs data, system logs data, security logs data, network logs data, audit logs data, and database logs data.

Application log data can be used to determine the root cause for errors within applications executing on the monitored system(s) 105, because the logs can be a record of actions within the system's applications. Application logs can include application exceptions, error events such as startup/stop, SQL logs, warnings, and debugging information. System logs data can record events that occur in the operating systems of monitored system(s) 105. These events can include system startups, system shutdowns, and hardware or software failures. These logs can provide insights into system health and performance.

Security logs data can record events related to malicious activities or attempted security breaches. The security logs data can be used to identify potential threats and to help prioritize responses to these risks. Network logs data can record events about traffic flows within a network. Network logs can provide visibility into network activities, help identify bottlenecks or anomalies, and assist in optimizing network performance. Network logs can include TCP/IP protocols data, source and destination IP addresses, connection events such as attempts/timeout, user activity data such as login attempts and time, performance information such as packet loss, latency, bandwidth, application activity such as data access and processing, and warnings/errors/debugging information.

Audit logs data can document events as part of an audit or compliance control process. Audit logs can record actions taken by users or systems so that the activity of the users or systems can be reconstructed for regulatory and compliance purposes. Database log data can include a record of transactions, changes, and performance metrics. The database logs data can help maintain data integrity and recover data in the event of a system failure.

The logs data that is output by the monitored system(s) 105 can be ingested by a logs analysis system 110 (e.g., a first system). The logs data can be received at a logs data ingest and analysis system 120 of the logs analysis system 115. The ingested logs data can be stored to a logs data storage 125 by the logs data ingest and analysis system 120. The logs data may be processed by the logs ingest and analysis system 120 before presentation to a user system 130.

The processing by the logs ingest and analysis system 120 can be performed in response to a request from the user system 130. The request may include information about the logs data that is to be presented to the user system. This information can be used to identify stored logs data from the logs data storage 125, and, for example, the request may identify the types of logs data that is to be presented, a timeframe for the requested logs data (e.g., a time period for the creation of the requested logs data), and sources for the logs data (e.g., network addresses or device identifiers).

The logs ingest and analysis system 120 may organize and index the logs data that was identified using the request. For example, the logs data may be indexed, or otherwise organized, by device identifier, event time, or network address so that the logs data for a particular device can be presented to the user in an organized format. The logs ingest and analysis system 120 can be transformed into a standardized format for presentation to the user system 130. For example, redundant data can be removed by the logs ingest and analysis system 120. The logs data may be transformed to conform with security policies or business rules, and, for example, the logs ingest and analysis system 120 may remove login information and encrypt the data. In addition or alternatively, the logs ingest and analysis system 120 may augment the logs data by, for example, adding geolocation information to network addresses, changing status codes to the corresponding error message text, or importing network session details from applications or cloud-based services. Upon or after transformation, the logs ingest and analysis system 120 may store the transformed logs data to the logs data storage 125 in a compressed or uncompressed format.

The monitored system(s) 105 may produce observability metrics data (e.g., metrics or observability data) that is monitored by observability system 135 (e.g., a second system). The observability metrics data can be received from the monitored system(s) 105 at the observability data ingest and analysis system 140. Logs data can include text-based descriptions of an event, or an event code, with a timestamp, and a metric can be a numeric property of a monitored system. The associated data for a metric can include a metric type, a metric name, a metric source, and a metric time. The metric types can include a value of a measurement at a specific point in time called a gauge (e.g., CPU utilization percentage of a server), total number of occurrences or items during a measurement period called a cumulative counter (e.g., a total number of API calls since a server has been initialized), a number of new occurrences or items since a last measurement called a counter (e.g., the number of failed packets during each 24-hour interval), and histograms representing a distribution of measurements across time (e.g., a bucket histogram showing successful screen loads for a web browser application).

The observability metrics data can be received from the monitored system(s) at the observability data ingest and analysis system 135. Observability metrics and associated data can include the metric type, a metric name, information identifying a source for the metric (e.g., a metric source), and a time associated with the metric (e.g., a metric time). The metric type can be a label that is assigned to the observability metrics data as the data is output by the monitored system(s) 105, and the observability metrics ingest and analysis system 135 may assign a different name to the data. For example, "4xxErrorRate" may be mapped to "RequestErrorRate" because the error code "4xx" corresponds to a percentage of failed requests over a given time period.

In some embodiments, the observability metrics ingest and analysis system 135 may assign an event time (e.g., a metric time) to ingested data. Observability metrics data may be ingested at the observability system 135 and communicated to the logs analysis system 115 in real time. Real time can mean that the data is presented within a time period of the data's generation by the monitored system or the data's reception at the observability system, or the data's reception at the logs analysis system. The time period can be 1 millisecond (ms), 5 ms, 10 ms, 25 ms, 50 ms, 100 ms, 200 ms, 300 ms, 400 ms, 500 ms, 1 second(s), 2 s, 5 s, 10 s, 20 s, 30 s, 1 minute (min), 2 min, 5 min, 10 min, 15 min, and 1 hour. The metrics data may be "rolled up" or aggregated during these time periods and the aggregated data may be presented. For example, the data can be summed or averaged before output.

The user system 130 may request any combination of observability metrics data and logs data for presentation on a dashboard 145. The request can be provided by a user of the user system 130, and a user can be any entity that can be logged into a service and a user can include an account, a computer device, and a set of login credentials. A human person may be associated with one or more users (e.g., digital personas). The request can include information that can be used to identify requested observability data 147 and requested logs data 149, and, for example, the request can identify a source, a time period, etc. The dashboard can be accessed through a web browser application (e.g., browser 151) that is executing on the user system 130.

The user system 130 may need to be authenticated before the requested observability data 147 and/or the requested logs data 149 can be provided to the dashboard 145. A roles-based access control (RBAC) system 155*a* within the logs analysis system 115 can use credentials in a login request from the user system 130 to authenticate the user system 130. For example, the user system can provide login credentials (e.g., a username and password) to the roles-based access control system 155*a* via the browser 151. The roles-based access control system can authenticate the credentials by comparing the received access credentials against expected values in an access credential database. The roles-based access control system 155*a* can provide an access token, or an access token cookie, to the user system 130 in response to authenticating the login credentials. The rules-based access control system 155*a* can generate the access token by cryptographically signing the access credentials with a private key (e.g., Diffie-Helman Key Encryption).

The roles-based access control system 155*a* can determine one or more permissions associated with the user of the user system 130, and the permissions can be associated with a role of the user within the logs analysis system 115. For example, the roles can include one or more organizations, groups, and accounts that are associated with the user. The permissions can determine the types of data that are available for presentation to the user, and the roles-based access control system 155*a* can use the roles to determine whether to accept or deny a request from the user system 130. The roles-based access control system 155*a* can accept a request that includes a request for logs data by retrieving the logs data from logs data storage 125 and providing the retrieved logs data to the dashboard system 160*a*. The dashboard system 160*a* can generate instructions that cause the user system 130 to display the requested data on dashboard 145 as requested logs data 149. In some embodiments, the dashboard system 160*a* can generate one or more visualizations of the requested logs data 149 for presentation on dashboard 145. The roles-based access control system 155*a* can accept a request that identifies observability metrics data by forwarding the request to the roles-based access control system 155*b*. A request from the user system 130 can include a request for observability metrics data, a request for logs data, or a request for both observability metrics data and logs data.

A request can include the access token that was returned during a successful login attempt and the authentication token can allow for single sign in functionality between the logs analysis system 115 and the observability system 135. The roles-based access control system 155*a* can use the access token to authenticate a request. The roles-based access control system 155*a* may forward the access token to roles based access control system 155*b*, or the user system 130 may provide the access token directly to the roles based access control system 155*b*. The access token can be cryptographically signed with a private key of the roles-based access control system 155*a* and the roles-based access control system 155*b* can request the corresponding public key from the roles-based access control system 155*a*. The roles-based access control system 155*b* can use the public key to authenticate the access token. After authentication, the rules-based access control system 155*b* may request one or more roles for the user associated with the request from the rules-based access control system 155*a*, and the rules-based access control system 155*b* may use the roles (e.g., permissions) to determine whether to provide some or all of the requested observability metrics data. After authentication, the roles based-access control system 155*b* can return the access token to the user system 130.

The requested observability metrics data can be provided to the dashboard system 160*b*. The dashboard system 160*b* can provide information that can be used to identify the requested data to the roles-based access control system 155*b*, and the roles-based access control system 155*a* can verify whether the authenticated user has access to the data. If the request is authenticated, the roles-based access control system 155*b* can retrieve provide the information to the observability data ingest and analysis system 140 so that the data can be streamed to the dashboard system 160*b*. The dashboard system 160*b* may transform the data and/or generate visualizations for the received data.

The dashboard system 160*b* may provide the data to the interoperability system 165*b* so that the data can be provided to the interoperability system 165*a*. The data may be sent as a stream between the interoperability systems 160*a*-160*b*, and the data may be sent using a two-way communication protocol such as WebSocket. The interoperability systems 160*a*-160*b* may transform the data so that the streamed data is in a format that is understandable by the logs analysis system 115.

The dashboard system 160*a* may provide data received via the interoperability system 165*a* to the dashboard 145. The requested observability data 147 and the requested logs data 149 may be presented simultaneously on a single display device of the user system 130. In various embodiments, the dashboard system 160*a* may cause the dashboard to present the requested observability data 147, the requested logs data 149, or both the requested observability data 147 and the requested logs data 149. In some embodiments, the observability data mya be presented in real time. In some embodiments, the logs data may need to be processed before presentation and the observability data can be stored until the logs data is processed. In such embodiments, the logs data can be presented concurrently with the stored observability data.

Figure 2:
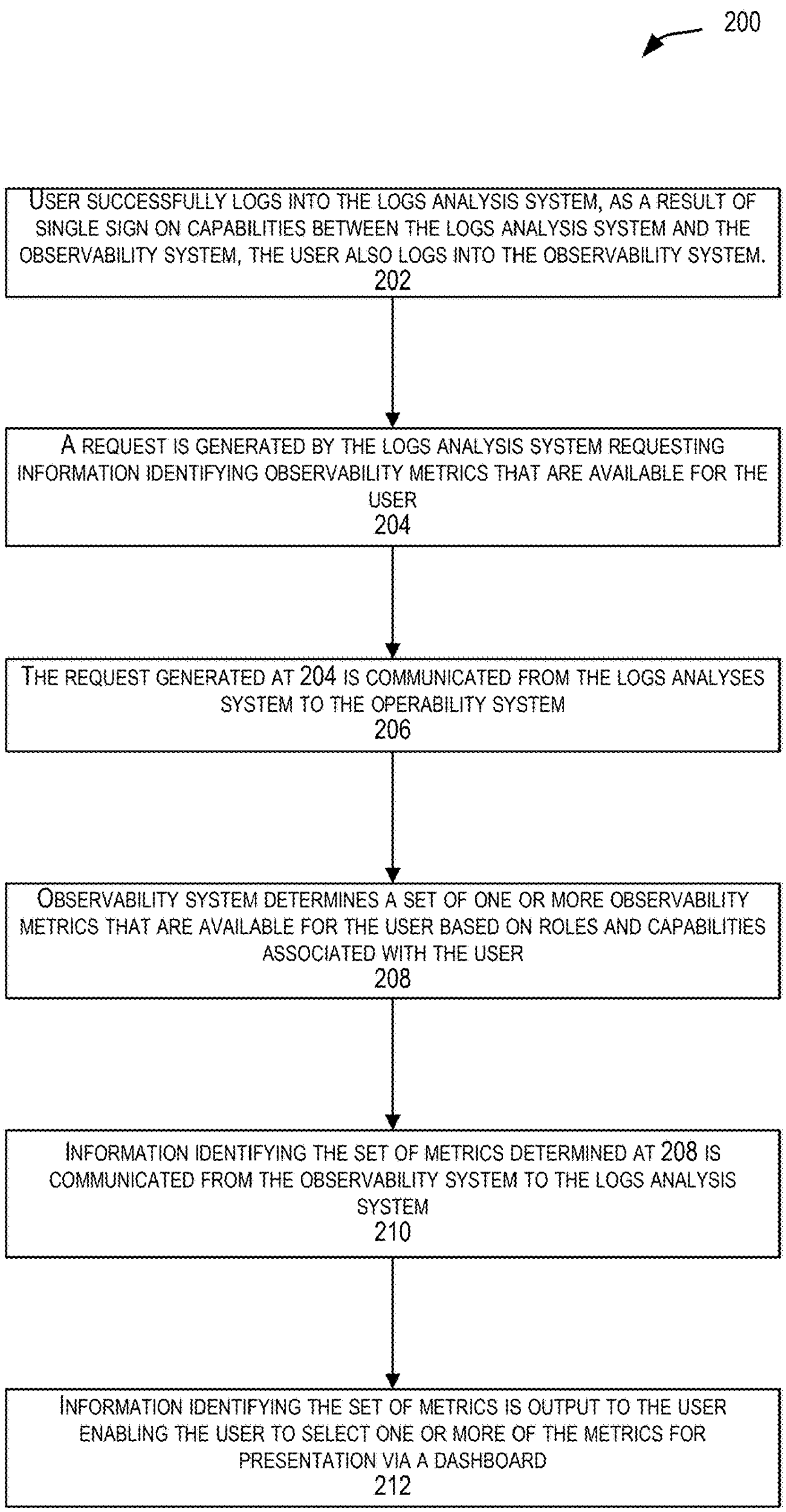
FIG. 2 is a simplified diagram of a technique for selecting metrics for presentation according to at least one embodiment.

FIG. 2 is a simplified diagram of a technique 200 for selecting metrics for presentation according to at least one embodiment. This technique is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the techniques.

Turning to technique 200 as shown in FIG. 2 in greater detail, at block 202, a user successfully logs into a logs analysis system and an observability system. The successful login is the result of single sign in capabilities between the logs analysis system and the observability system.

At block 204, a request is generated by the logs analysis system. The request requesting information that identifies observability metrics that are available for the user.

At block 206, the request generated at 204 is communicated from the logs analysis system to the observability system.

At block 208, the observability system determines a set of one or more observability metrics that are available for the user. The observability system can use the roles and capabilities associated with the user to determine the set of one or more observability metrics.

At block 210, information identifying the set of metrics determined at 208 can be communicated from the observability system to the logs analysis system.

At block 212, information identifying the set of metrics is output the user. The user is enabled to use the information to select one or more of the metrics for presentation via a dashboard.

Figure 3A:
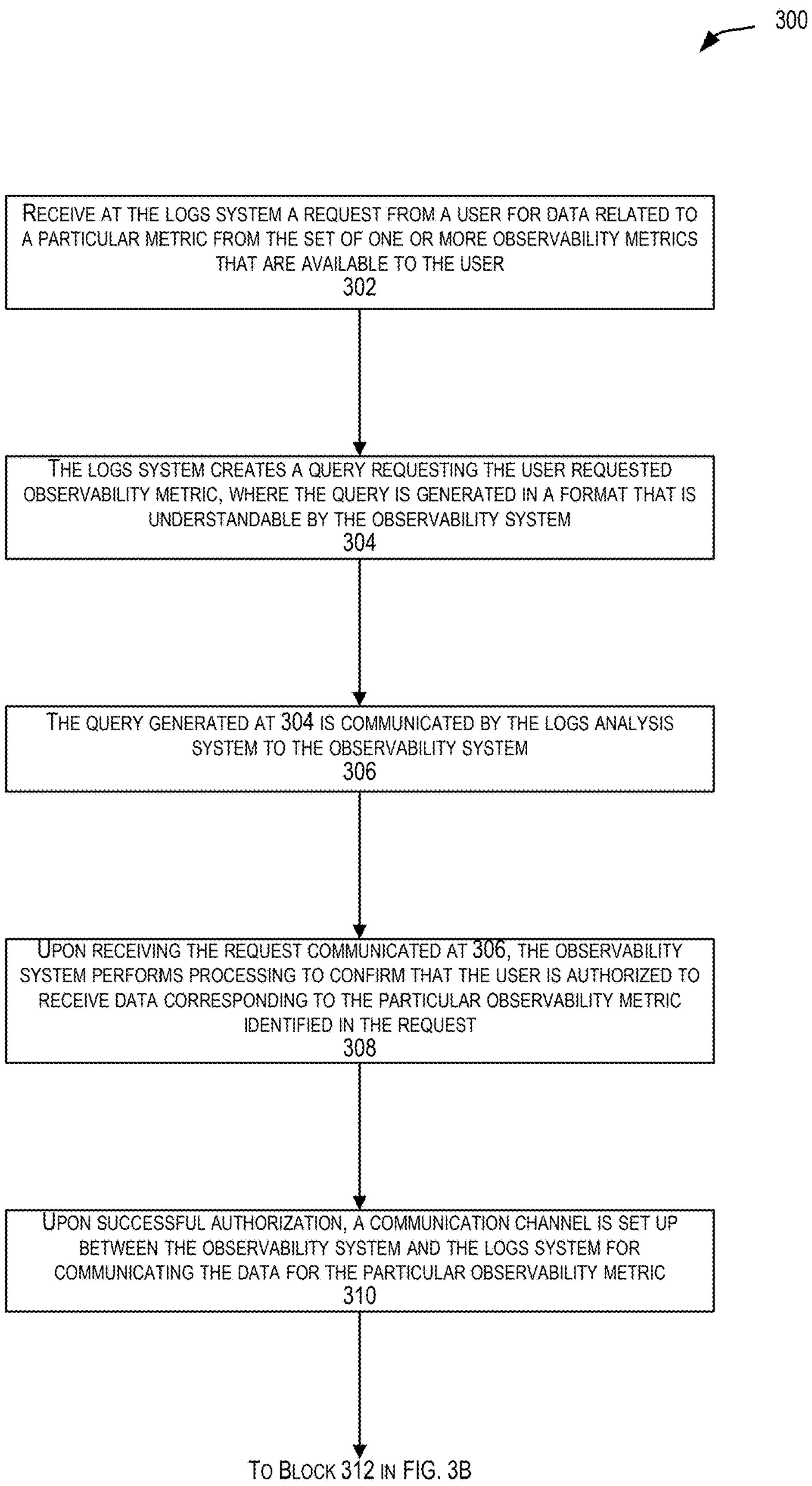
FIGS. 3A-3B are simplified diagrams of a technique for displaying observability metrics according to at least one embodiment.
Figure 3B:
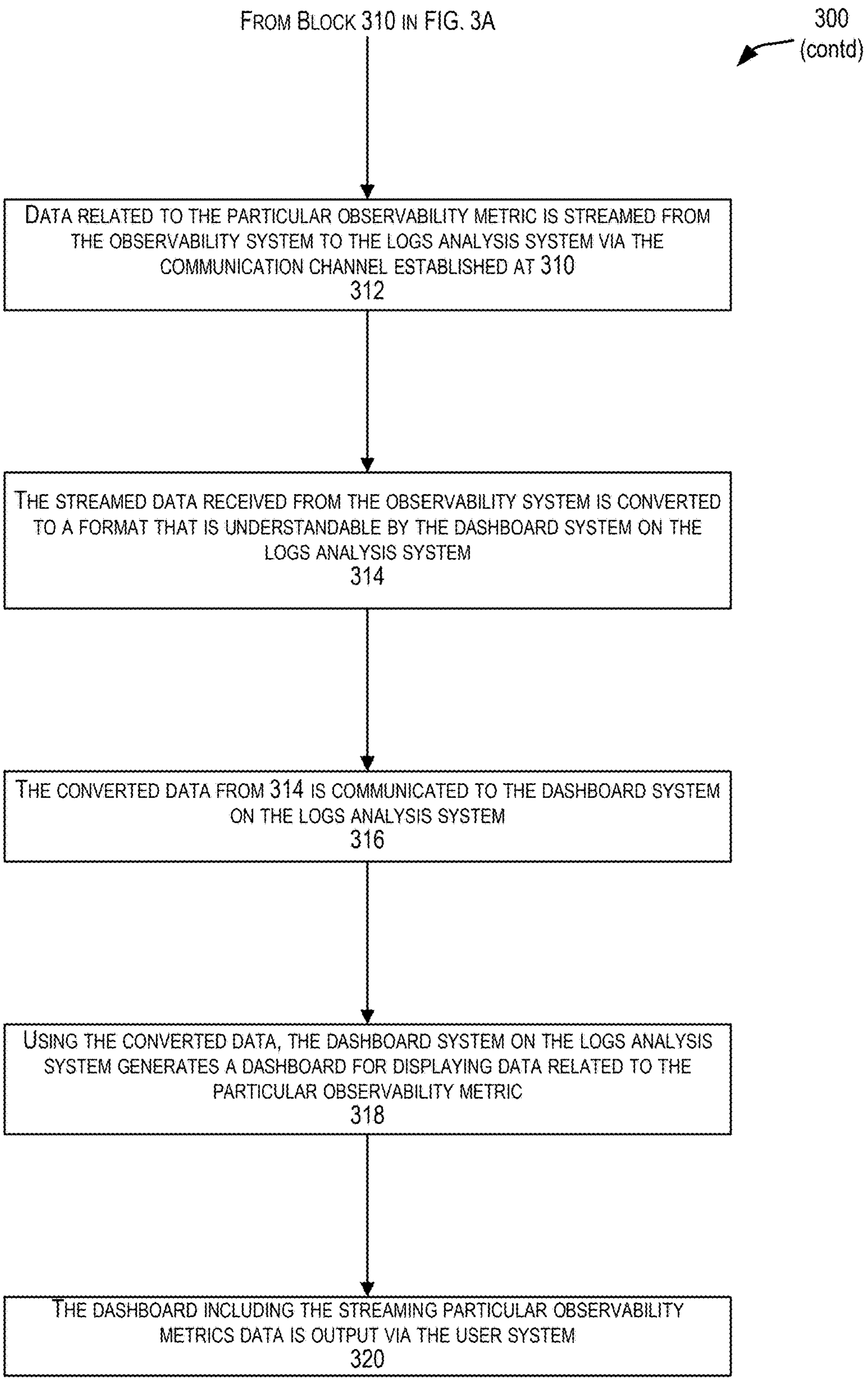

FIGS. 3A-3B are simplified diagrams of a technique 300 for displaying observability metrics according to at least one embodiment. This technique is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the techniques.

Turning to technique 300 as shown in FIG. 3A in greater detail, at block 302, a request for data related to an observability metric can be received at a logs system. Observability metric can be a particular metric of one or more observability metrics that are available to a user.

At block 304, the logs system can create a query requesting the user requested observability metric. The query can be generated in a format that is understandable by the observability system.

At block 306, the query generated at 304 is communicated by the logs analysis system to the observability system. The query can be communicated via a network connection.

At block 308, the observability system can perform processing to confirm that the user is authorized to receive data corresponding to the particular observability metric identified in the request. The processing can be performed upon receiving the request communicated at 306.

At block 310, a communication channel is set up between the observability system and the logs system for communicating the data for the particular observability metric. The communication channel can be set up upon successful authorization of the user.

Turning to technique 300 as shown in FIG. 3B in greater detail, at block 312, data related to the particular observability metric is streamed from the observability system to the logs analysis system. The data can be streamed via the communication channel established at 310.

At block 314, the streamed data that is received from the observability system is converted to a format that is understandable by the dashboard system on the logs analysis system.

At block 316, the converted data from 314 is communicated to the dashboard system on the logs analysis system.

At block 318, the dashboard system on the logs analysis system generates a dashboard for displaying data related to the particular observability metric. The dashboard system may generate the dashboard using the converted data.

At block 320, the dashboard is output via the user system. The output dashboard can include the streaming particular observability metrics.

Figure 4A:
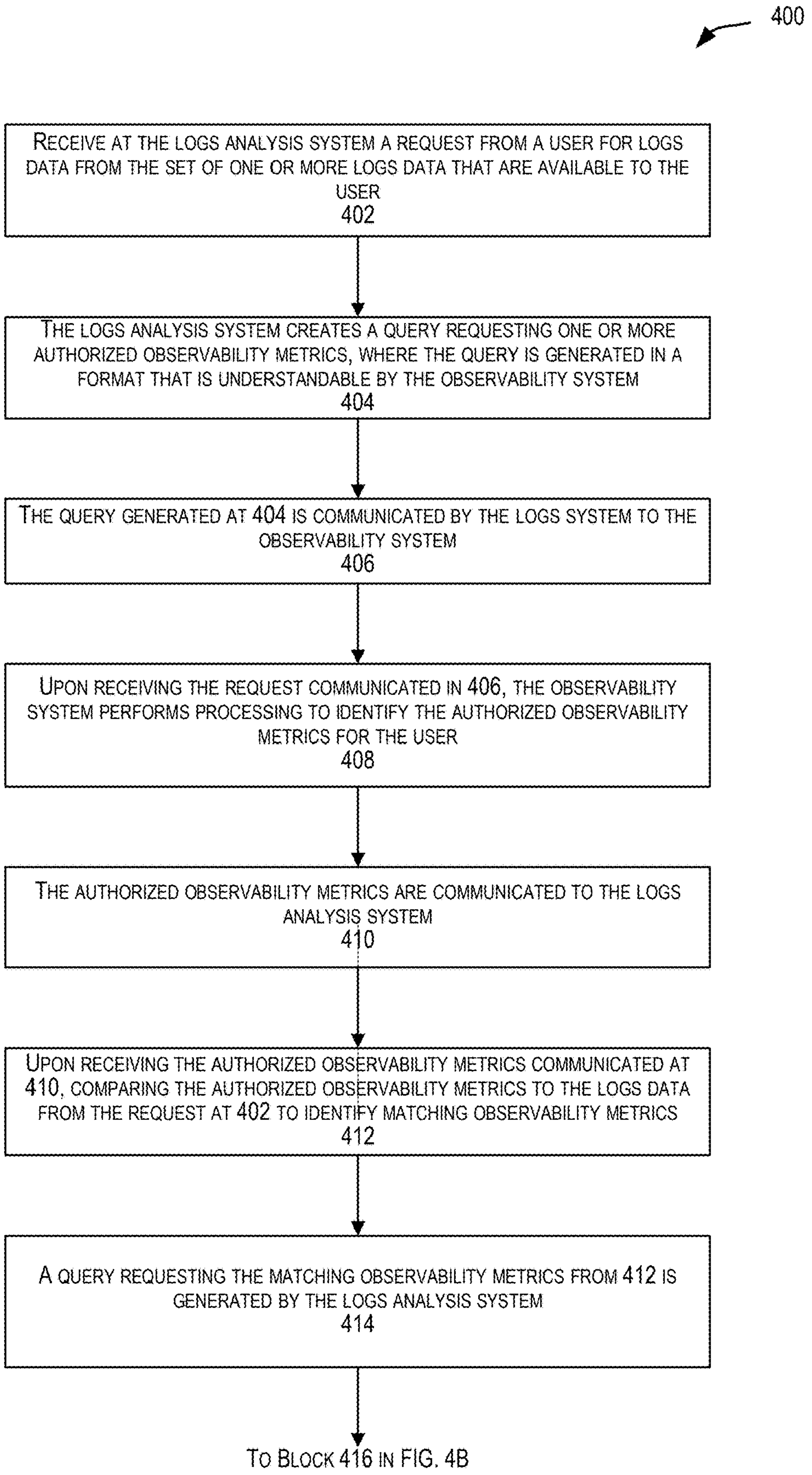
FIGS. 4A-4B are simplified diagrams of a technique for generating a dashboard that simultaneously displays observability metrics and logs data according to at least one embodiment.
Figure 4B:
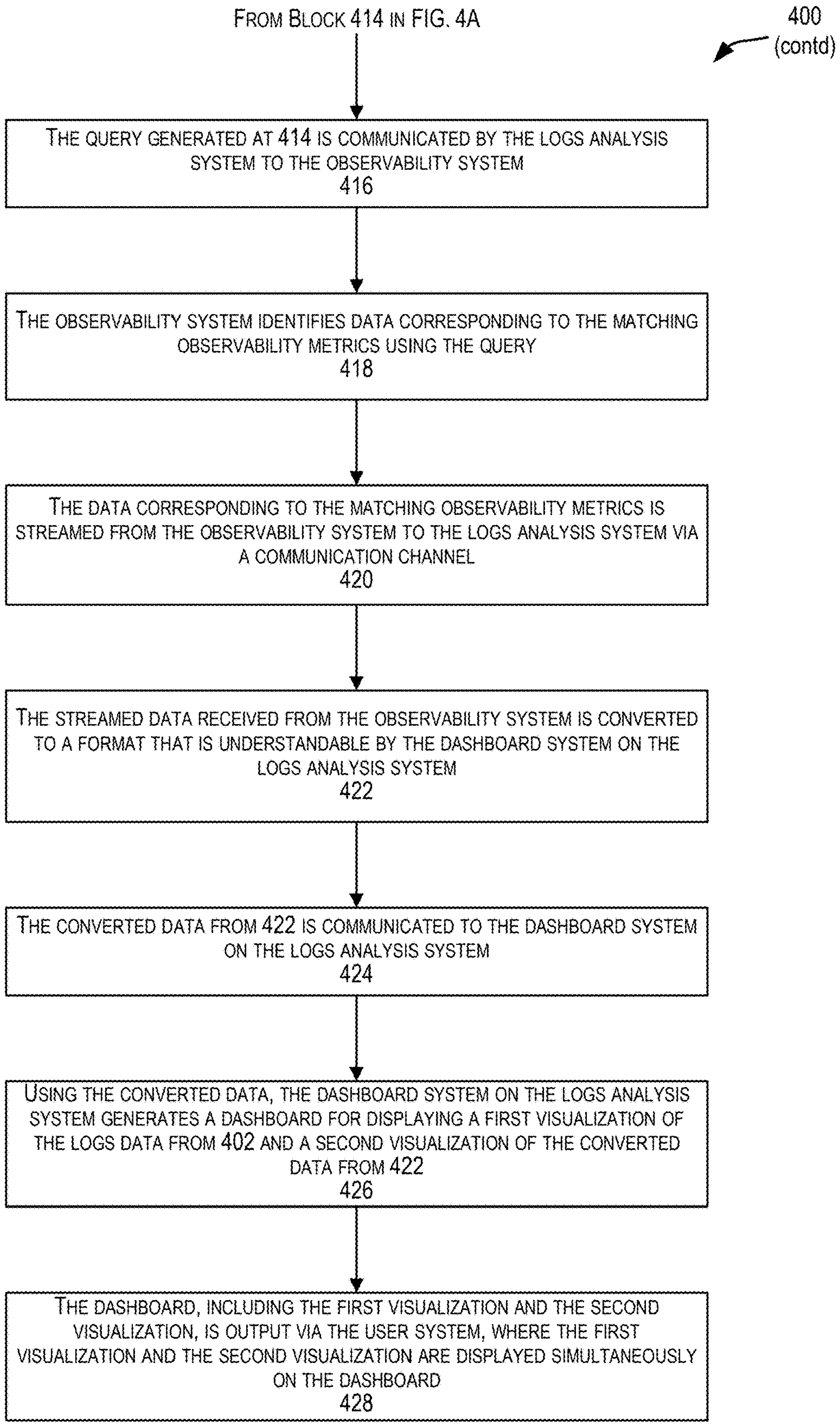

FIGS. 4A-4B are simplified diagrams of a technique 400 for generating a dashboard that simultaneously displays observability metrics and logs data according to at least one embodiment. This technique is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the techniques.

Turning to technique 400 as shown in FIG. 4A in greater detail, at block 402, a request from a user for logs data can be received at the logs analysis system. The request can be received from a user system, and the requested logs data can be one of the set of one or more logs data that are available to the user.

At block 404, the logs analysis system can create a query requesting one or more authorized observability metrics. The query can be generated in a format that is understandable by the observability system.

At block 406, the query generated at 404 is communicated by the logs system to the observability system.

At block 408, the observability system can perform processing to identify the authorized observability metrics for the user. The observability system can perform the processing upon receiving the request that was communicated at 406.

At block 410, the authorized observability metrics are communicated to the logs analysis system. The metrics can be communicated to the logs analysis system by the observability system.

At block 412, the authorized observability metric scan be compared to logs data from the request at 402 to identify matching observability metrics. The comparison can be made by the logs analysis system upon receiving the authorized observability metrics that were communicated at 410.

At block 414, a query requesting the matching observability metrics from 412 can be generated by the logs analysis system.

Turning to technique 400 as shown in FIG. 4B in greater detail, at block 416, the query generated at 414 is communicated by the logs observability system to the observability system.

At block 418, the observability system identifies data corresponding to the matching observability metrics. The observability system can use the query to identify the matching observability metrics.

At block 420, the data corresponding to the matching observability metrics is streamed from the observability system to the logs analysis system via a communication channel.

At block 422, the streamed data that is received at the logs analysis system from the observability system can be converted to a format that is understandable by the dashboard system on the logs analysis system.

At block 424, the converted data from 422 is communicated to the dashboard system on the logs analysis system.

At block 426, the dashboard system on the logs analysis system generates a dashboard for displaying a first visualization of the logs data from 402 and a second visualization of the converted data from 422.

At block 428, the dashboard is output via the user system. The dashboard can include the first visualization and the second visualization, and the first visualization and the second visualization can be displayed simultaneously on the dashboard.

Figure 5:
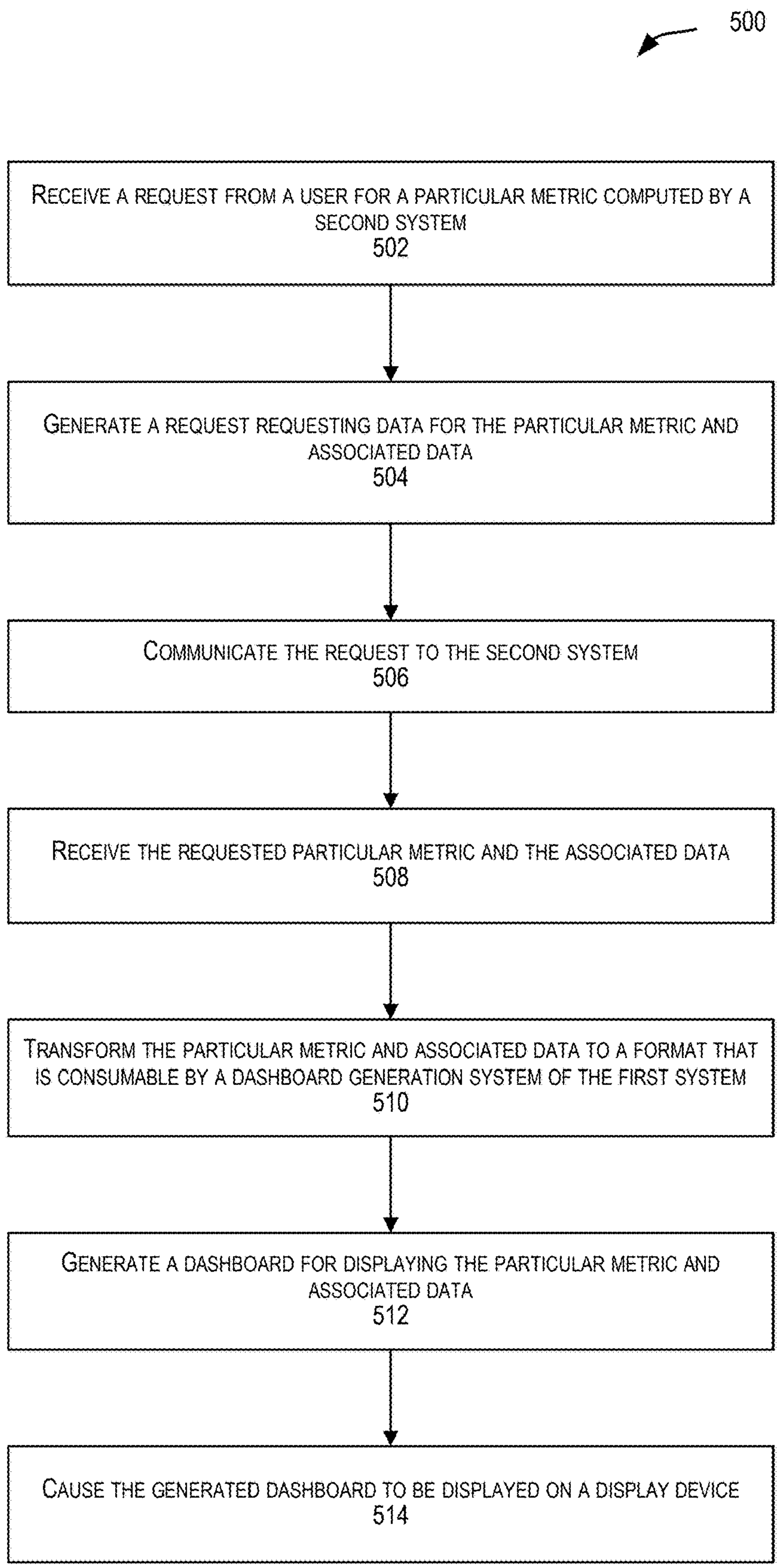
FIG. 5 shows a flowchart of a method for displaying observability metrics according to at least one embodiment.

FIG. 5 shows a flowchart of a method 500 for displaying observability metrics according to at least one embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the method.

Turning to method 500 in greater detail, at block 502, a request for a particular metric can be received by a first system. In some embodiments, the first system can be an observability system. The request can be received from a user. For example, the request can be received from a user system (e.g., user system 130). The particular metric can be computed by a second system (e.g., observability system 135), and the request can be received at a first system such as logs analysis system (e.g., logs analysis system 115). The user can be a digital persona of a human person and a single human person can correspond to multiple users. Any combination of the observability system and the logs analysis system can be implemented as a service that is provided by a cloud service provider. The user can be a subscriber of the services that are provided by the cloud service provider. The user may be authenticated using an access token. The first system can store an access token that is generated upon successful single sign on of the user into the second system via the first system.

The first system can perform a first set of functions comprising: receiving a plurality of logs from a monitored system. The plurality of logs can comprise one or more of application logs data, system logs data, security logs data, network logs data, audit logs data, and database logs data. The second system can perform a second set of functions comprising: receiving observability data for the monitored system; and generating a set of one or more metrics based on the received observability data. The observability data can comprise measurements of the monitored system, and the set of one or more metrics can comprise the particular metric. The first set of functions can be provided as a first cloud service by a cloud service provider and the second set of functions can be provided as a second cloud service by the cloud service provider. The first cloud service and the second cloud service are services that can be subscribed to by one or more customers of the cloud service provider (e.g., users).

At block 504, generate a request requesting data for the particular metric and associated data. A particular metric can be a particular type of observability metric that is associated with a particular source, and a particular user, that occurred within a particular time frame. A particular metric can be an observability metric that is associated with a particular event that is identified from logs data. The request can include information identifying the user, and the request can be generated in a format that is understandable by the observability system. The observability metric data can be a numeric property of a monitored system (e.g., monitored system(s) 105). The metric can be the numeric property and the associated data for the metric can include any combination of a metric type, a metric name, a metric source, and a metric time.

At block 506, the request can be communicated to the second system. The request can be communicated by the first system. A communication channel between the second system and the first system can be established in response to the request. The request may be communicated via the communication channel. Communicating the request from the first system to the second system can comprise communicating the access token from the first system to the second system.

At block 508, the requested particular metric and the associated data can be received. The particular metric and the associated can be received by the first system and from the second system. For example, the particular metric and the associated data can be communicated via a communication channel between the first system and the second system. The communication channel can be a two-way communication channel such as a communication channel that is implemented using the WebSocket communication protocol. The particular metric and associated data can be received in response to the communication by the first system. The particular metric can be communicated in real time via the communication channel.

At block 510, the particular metric and associated data can be transformed to a format that is consumable by a dashboard generation system of the first system. The particular metric and associated data be transformed by the first system.

At block 512, a dashboard for displaying the particular metric and associated data can be generated. The dashboard can be generated by the dashboard generation system of the first system. In some embodiments, a second request can be received via the dashboard, and a second dashboard can be created and provided to the user system in response to the second request.

At block 514 the generated dashboard to be displayed on a display device. The display device can be a display device of a user system. The particular metric and associated data can be streamed to the dashboard, and the particular metric and associated data may be streamed in real time. The particular metric can be multiple metrics in various embodiments. Real time can mean that the data is presented within a time period of the data's generation by the monitored system or the data's reception at the observability system, or the data's reception at the logs analysis system. The time period can be 1 millisecond (ms), 5 ms, 10 ms, 25 ms, 50 ms, 100 ms, 200 ms, 300 ms, 400 ms, 500 ms, 1 second(s), 2 s, 5 s, 10 s, 20 s, 30 s, 1 minute (min), 2 min, 5 min, 10 min, 15 min, and 1 hour.

Figure 6:
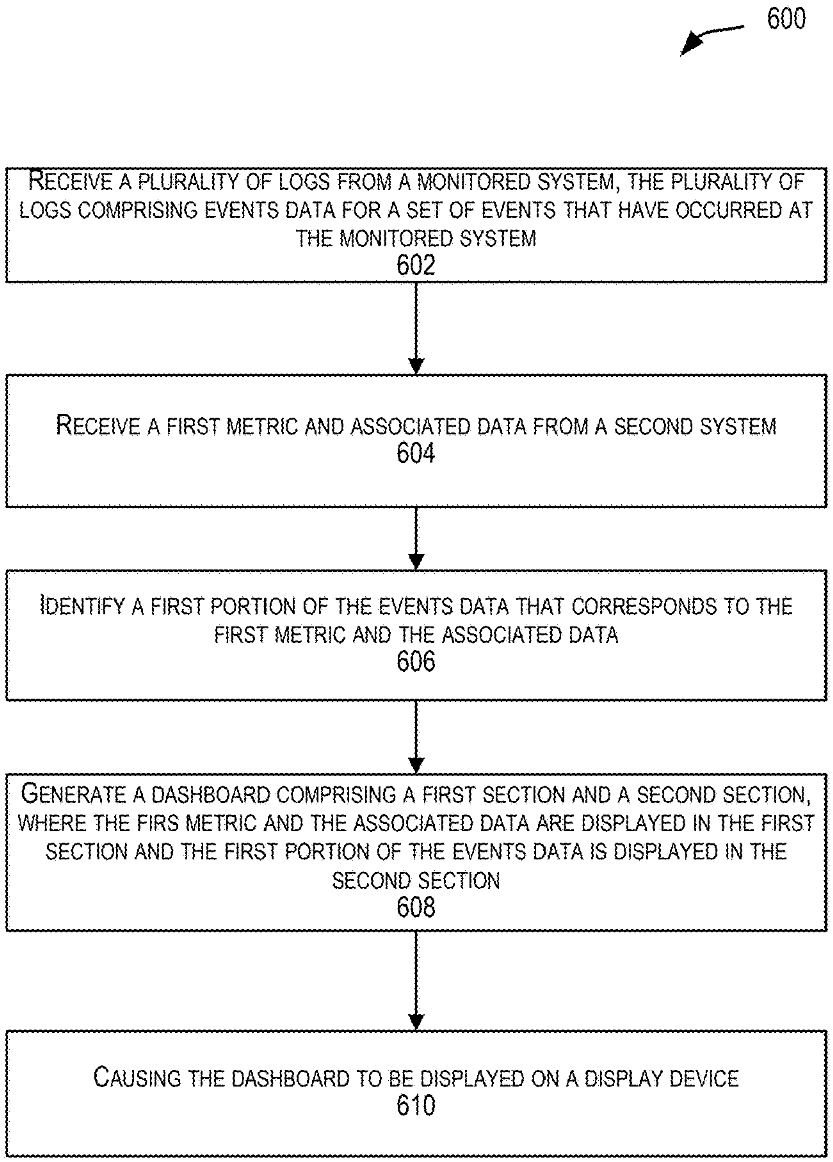
FIG. 6 shows a flowchart of a method for generating a dashboard that simultaneously displays observability metrics and logs data according to at least one embodiment.

FIG. 6 shows a flowchart of a method 600 for generating a dashboard that simultaneously displays observability metrics and logs data according to at least one embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the method.

Turning to method 600 in greater detail, at block 602, a plurality of logs from a monitored system are received. The plurality of logs can comprise events data for a set of events that have occurred at the monitored system. The locs can be received at a first system (e.g., a logs analysis system). The first system can perform a first set of functions comprising: receiving a plurality of logs from a monitored system. The plurality of logs can comprise one or more of application logs data, system logs data, security logs data, network logs data, audit logs data, and database logs data. The second system can perform a second set of functions comprising: receiving observability data for the monitored system; and generating a set of one or more metrics based on the received observability data. The observability data can comprise measurements of the monitored system, and the set of one or more metrics can comprise the particular metric. The first set of functions can be provided as a first cloud service by a cloud service provider and the second set of functions can be provided as a second cloud service by the cloud service provider. The first cloud service and the second cloud service are services that can be subscribed to by one or more customers of the cloud service provider (e.g., users).

At block 604, a first metric and associated data can be received from a second system. The second system can be an observability system. The first metric and associated data can be received at a logs analysis system and from an observability system. The first metric can be computed by the second system based upon observability data received by the second system for the monitored system. The first metric and associated data can be received via a communication channel between the first system and the second system. The first metric and associated data can be received in real time. The first metric can comprise a numeric property of a monitored system, and the associated data can comprise one or more of a metric type, a metric name, a metric source, and a metric time. Real time can mean that the data is presented within a time period of the data's generation by the monitored system or the data's reception at the observability system, or the data's reception at the logs analysis system. The time period can be 1 millisecond (ms), 5 ms, 10 ms, 25 ms, 50 ms, 100 ms, 200 ms, 300 ms, 400 ms, 500 ms, 1 second(s), 2 s, 5 s, 10 s, 20 s, 30 s, 1 minute (min), 2 min, 5 min, 10 min, 15 min, and 1 hour.

At block 606, a first portion of the events data that corresponds to the first metric and the associated data can be identified. The first portion can be identified by the first system and from the events data of the plurality of logs. The first portion can identified using any information that can be used to identify the first metric. The first metric can be a particular type of observability metric that is associated with a particular source, and/or a particular user, that occurred within a particular time frame. In some embodiments, the first metric can be an observability metric that is associated with a particular event that is identified from logs data.

Identifying the first portion can comprise identifying correlation information to be used for identifying a portion of the events data that correlated to the first metric. The correlation information can be identified by the first system and from the first metric and the associated data for the first metric. The correlation information can include a network address identified in the associated data for the first metric, a device identifier identified in the associated data for the first metric, or a time range identified in the associated data for the first metric. The first system can use the correlation information to determine the first portion of the events data. Event times for the identified set of events and reception times for the first metric can be within a time range.

At block 608, a dashboard can be generated by a dashboard generation system of the first system. The dashboard can display the first metric and the associated data in a first section of the dashboard and the first portion of the events data can be displayed in a second section of the dashboard. The first section and the second section can be displayed concurrently on the dashboard. In some embodiments, the first portion be available for presentation after a delay during which the events data is processed. In such circumstances, the first metric and associated can be stored until the events data is processed and the stored observability data can be presented concurrently with the processed events data. The first metric and the associated data may be transformed by the first system to a format that is consumable by the dashboard generation system of the first system.

At block 610, the first system can cause the dashboard to be displayed on a display device. The first system can cause a user system to display the dashboard. The first portion of the dashboard and the second portion of the dashboard can be displayed concurrently on the display device.

Figure 7:
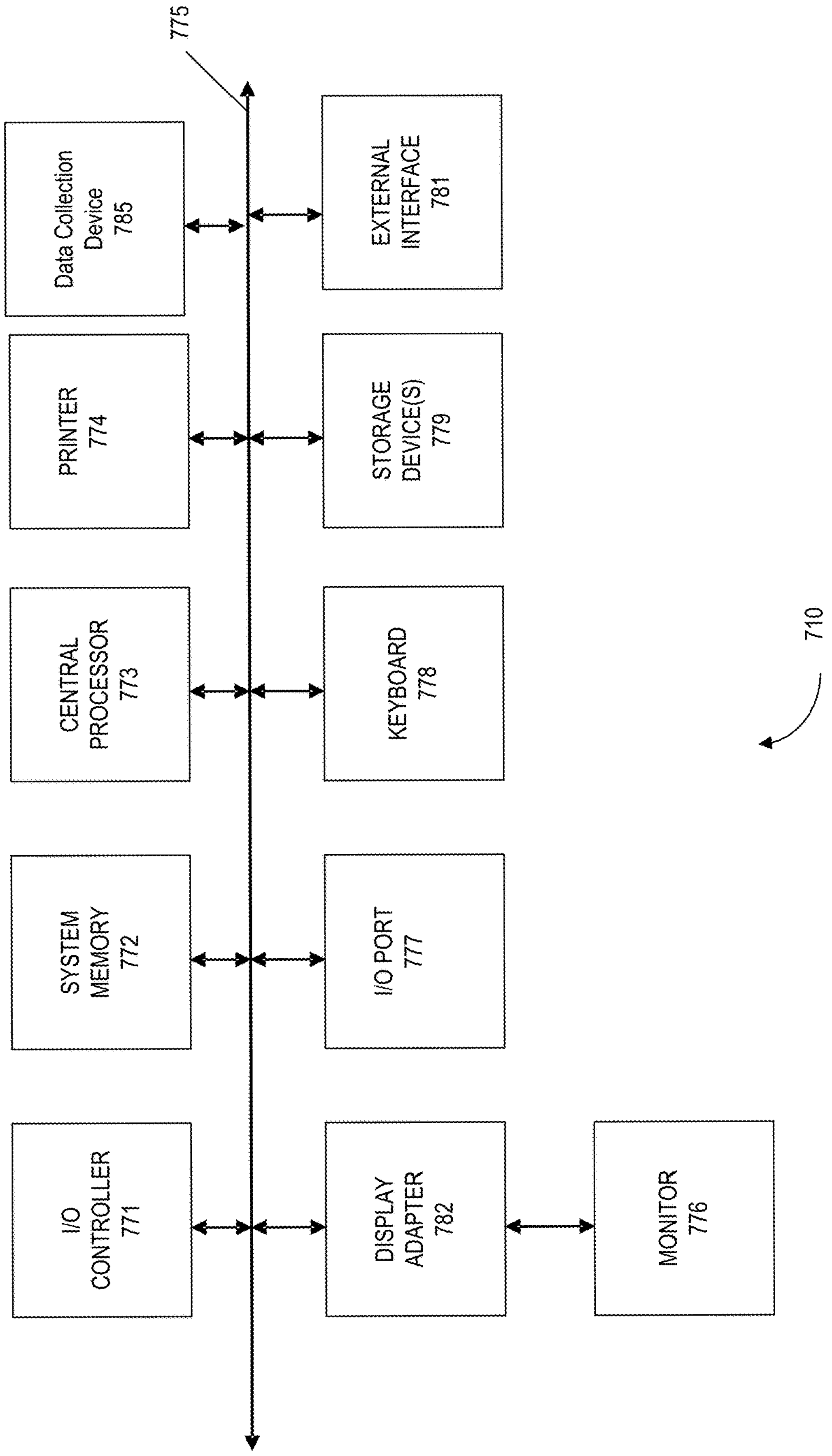
FIG. 7 shows a simplified diagram of a computer according to at least one embodiment.

Any of the computer systems mentioned herein may utilize any suitable number of subsystems. Examples of such subsystems are shown in FIG. 7 in computer system 710. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 7 are interconnected via a system bus 775. Additional subsystems such as a printer 774, keyboard 778, storage device(s) 779, monitor 776 (e.g., a display screen, such as an LED), which is coupled to display adapter 782, and others are shown. Peripherals and input/output (I/O) devices, which couple to I/O controller 771, can be connected to the computer system by any number of means known in the art such as input/output (I/O) port 777 (e.g., USB, FireWire®). For example, I/O port 777 or external interface 781 (e.g. Ethernet, Wi-Fi, etc.) can be used to connect computer system 710 to a wide area network such as the Internet, a mouse input device, or a scanner. The interconnection via system bus 775 allows the central processor 773 to communicate with each subsystem and to control the execution of a plurality of instructions from system memory 772 or the storage device(s) 779 (e.g., a fixed disk, such as a hard drive, or optical disk), as well as the exchange of information between subsystems. The system memory 772 and/or the storage device(s) 779 may embody a computer readable medium. Another subsystem is a data collection device 785, such as a camera, microphone, accelerometer, and the like. Any of the data mentioned herein can be output from one component to another component and can be output to the user.

A computer system can include a plurality of the same components or subsystems, e.g., connected together by external interface 781, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method comprising:

receiving, by a first system provided as a first cloud service by a cloud service provider, a plurality of logs from a monitored system, the plurality of logs comprising events data for a set of events that have occurred at the monitored system;

receiving, by the first system and from a second system that is provided as a second cloud service by the cloud service provider and that is separate from the first system, a first metric and associated data, wherein the first metric is computed by the second system based upon observability data received by the second system for the monitored system, wherein the first metric comprises a numeric property of a monitored system, and the associated data comprises one or more of a metric type, a metric name, a metric source, and a metric time, and wherein the first cloud service and the second cloud service are services that can be subscribed to by one or more customers of the cloud service provider;

transforming, by the first system, the plurality of logs into a standardized format prior to correlation;

identifying, by the first system and from the events data, a first portion of the events data of the plurality of logs that is correlated to the first metric and the associated data based on identifying correlation information from the first metric and the associated data, where the identified correlation information comprises at least two of a network address, a device identifier, and a time identified in the associated data for the first metric;

generating, by a dashboard generation system of the first system, a dashboard comprising a first section and a second section, and causing, by the first system, the dashboard to be displayed on a display device, wherein:

the first metric and the associated data are displayed in the first section;

the first portion of the events data identified as correlated to the first metric is displayed in the second section;

the first metric and the first portion of the events data identified as correlated to the first metric are displayed concurrently on the dashboard; and the dashboard generation system causes the first metric and the first portion of the events data identified as correlated to the first metric to be displayed concurrently on the dashboard in real time.

2. The method of claim 1, wherein the identified correlation information comprises the device identifier identified in the associated data for the first metric.

3. The method of claim 1, wherein the identified correlation information comprises the time identified in the associated data for the first metric, and the time corresponds to a time range identified in the associated data for the first metric.

4. The method of claim 3, wherein event times for the set of events and reception times for the first metric are within the time range.

5. The method of claim 1, wherein the identified correlation information comprises the network address identified in the associated data for the first metric, and the method further comprises:

transforming, by the first system, the first metric and the associated data to a format that is consumable by the dashboard generation system of the first system.

6. The method of claim 1:

wherein the first system performs a first set of functions comprising:

receiving a plurality of logs from a monitored system, the plurality of logs comprising one or more of application logs data, system logs data, security logs data, network logs data, audit logs data, and database logs data; and wherein the second system performs a second set of functions comprising:

receiving observability data for the monitored system, the observability data comprising measurements of the monitored system; and generating a set of one or more metrics based on the received observability data, the set of one or more metrics comprising the first metric and the associated data.

7. The method of claim 6, wherein the first set of functions is provided as the first cloud service by the cloud service provider and the second set of functions is provided as the second cloud service by the cloud service provider, wherein the dashboard generation system causes the first metric and the first portion of the events data identified as correlated to the first metric to be displayed concurrently on the dashboard to provide integrated access to observability metrics data and logs data to reduce time to diagnose and correct errors within the monitored system.

8. A computing device comprising:

one or more memories; and one or more processors in communication with the one or more memories and configured to execute instructions stored in the one or more memories to perform operations to:

receive, by a first system provided as a first cloud service by a cloud service provider, a plurality of logs from a monitored system, the plurality of logs comprising events data for a set of events that have occurred at the monitored system;

receive, by the first system and from second system that is provided as a second cloud service by the cloud service provider and that is separate from the first system, a first metric and associated data, wherein the first metric is computed by the second system based upon observability data received by the second system for the monitored system, wherein the first metric comprises a numeric property of a monitored system, and the associated data comprises one or more of a metric type, a metric name, a metric source, and a metric time, and wherein the first cloud service and the second cloud service are services that can be subscribed to by one or more customers of the cloud service provider;

transform, by the first system, the plurality of logs into a standardized format prior to correlation;

identify, by the first system and from the events data, a first portion of the events data of the plurality of logs that is correlated to the first metric and the associated data based on identifying correlation information from the first metric and the associated data where the identified correlation information comprises at least two of a network address, a device identifier, and a time identified in the associated data for the first metric;

generate, by a dashboard generation system of the first system, a dashboard comprising a first section and a second section, and causing, by the first system, the dashboard to be displayed on a display device, wherein:

the first metric and the associated data is displayed in the first section;

the first portion of the events data identified as correlated to the first metric is displayed in the second section;

the first metric and the first portion of the events data identified as correlated to the first metric are displayed concurrently on the dashboard; and the dashboard generation system causes the first metric and the first portion of the events data identified as correlated to the first metric to be displayed concurrently on the dashboard in real time.

9. The computing device of claim 8, wherein the identified correlation information comprises the device identifier identified in the associated data for the first metric.

10. The computing device of claim 8, wherein the identified correlation information comprises the time identified in the associated data for the first metric, and the time corresponds to a time range identified in the associated data for the first metric.

11. The computing device of claim 10, wherein event times for the set of events and reception times for the first metric are within the time range.

12. The computing device of claim 8, wherein the identified correlation information comprises the network address identified in the associated data for the first metric, and the operations further:

transform, by the first system, the first metric and the associated data to a format that is consumable by the dashboard generation system of the first system.

13. The computing device of claim 8:

wherein the first system performs a first set of functions comprising operations to:

receive a plurality of logs from a monitored system, the plurality of logs comprising one or more of application logs data, system logs data, security logs data, network logs data, audit logs data, and database logs data; and wherein the second system performs a second set of functions comprising operations to:

receive observability data for the monitored system, the observability data comprising measurements of the monitored system; and generate a set of one or more metrics based on the received observability data, the set of one or more metrics comprising the first metric and the associated data.

14. The computing device of claim 13, wherein the first set of functions is provided as the first cloud service by the cloud service provider and the second set of functions is provided as the second cloud service by the cloud service provider.

15. A non-transitory, computer-readable medium storing a plurality of instructions that, when executed by one or more processors of a computing device, cause the one or more processors to perform operations to:

receive, by a first system provided as a first cloud service by a cloud service provider, a plurality of logs from a monitored system, the plurality of logs comprising events data for a set of events that have occurred at the monitored system;

receive, by the first system and from a second system that is provided as a second cloud service by the cloud service provider and that is separate from the first system, a first metric and associated data, wherein the first metric is computed by the second system based upon observability data received by the second system for the monitored system, wherein the first metric comprises a numeric property of a monitored system, and the associated data comprises one or more of a metric type, a metric name, a metric source, and a metric time, and wherein the first cloud service and the second cloud service are services that can be subscribed to by one or more customers of the cloud service provider;

transform, by the first system, the plurality of logs into a standardized format prior to correlation;

identify, by the first system and from the events data, a first portion of the events data of the plurality of logs that is correlated to the first metric and the associated data based on identifying correlation information from the first metric and the associated data where the identified correlation information comprises at least two of a network address, a device identifier, and a time identified in the associated data for the first metric;

generate, by a dashboard generation system of the first system, a dashboard comprising a first section and a second section, and causing, by the first system, the dashboard to be displayed on a display device, wherein:

the first metric and the associated data is displayed in the first section;

the first portion of the events data identified as correlated to the first metric is displayed in the second section;

the first metric and the first portion of the events data identified as correlated to the first metric are displayed concurrently on the dashboard; and the dashboard generation system causes the first metric and the first portion of the events data identified as correlated to the first metric to be displayed concurrently on the dashboard in real time.

16. The non-transitory, computer-readable medium of claim 15, wherein the identified correlation information comprises the device identifier identified in the associated data for the first.

17. The non-transitory, computer-readable medium of claim 15, wherein the identified correlation information comprises the time identified in the associated data for the first metric, and the time corresponds to a time range identified in the associated data for the first metric.

18. The non-transitory, computer-readable medium of claim 17, wherein event times for the set of events and reception times for the first metric are within the time range.

19. The non-transitory, computer-readable medium of claim 15, wherein the identified correlation information comprises the network address identified in the associated data for the first metric, and the operations further:

transform, by the first system, the first metric and the associated data to a format that is consumable by the dashboard generation system of the first system.

20. The non-transitory, computer-readable medium of claim 15:

wherein the first system performs a first set of functions comprising operations to:

receive a plurality of logs from a monitored system, the plurality of logs comprising one or more of application logs data, system logs data, security logs data, network logs data, audit logs data, and database logs data; and wherein the second system performs a second set of functions comprising operations to:

receive observability data for the monitored system, the observability data comprising measurements of the monitored system; and generate a set of one or more metrics based on the received observability data, the set of one or more metrics comprising the first metric and the associated data.

* * * * *